United States Patent [19]

Solomon

[11] Patent Number: 5,675,412
[45] Date of Patent: Oct. 7, 1997

[54] SYSTEM INCLUDING UNIFIED BEAMSPLITTER AND PARALLEL REFLECTING ELEMENT, AND RETROREFLECTING COMPONENT

[75] Inventor: Peter R. Solomon, West Hartford, Conn.

[73] Assignee: On-Line Technologies, Inc., East Hartford, Conn.

[21] Appl. No.: 562,418

[22] Filed: Nov. 24, 1995

[51] Int. Cl.$^6$ .................................................. G01B 9/02
[52] U.S. Cl. ........................... 356/345; 356/351; 356/353
[58] Field of Search .................................. 356/345, 351, 356/353

[56] References Cited

U.S. PATENT DOCUMENTS 2,841,049  7/1958  Scott .

OTHER PUBLICATIONS

W.H. Steel, "Interferometer for Fourier Spectroscopy," AFCRL–71–0019, p. 43 1970.
W.H. Steel, "On Mobius–Band Interferometer", National Standards Laboratory, Jul. 1994.

*Primary Examiner*—David C. Nelms
*Assistant Examiner*—Robert Kim
*Attorney, Agent, or Firm*—Ira S. Dorman

[57] ABSTRACT

A moving mirror interferometer consists of a back-to-back double mirror, operatively interposed in the paths of beams from a beamsplitter/parallel reflecting mirror combiner, and a corner cube retroreflector. One beam component from the combiner is directed toward the retroreflector, and arrives therefrom at one side of the double mirror rotated 180° about its central axis; the other component from the combiner arrives at the opposite side of the double mirror without axial rotation. Alignment in the interferometer is insensitive to shearing or tilting of the optical components; the components may be semi-rigidly mounted for resilient deflection, so as to isolate them against distortion of the supporting structure, and dynamic beam path-length variation may optimally be produced by moving the corner cube retroreflector, the back-to-back double mirror, or both.

5 Claims, 1 Drawing Sheet

1

SYSTEM INCLUDING UNIFIED BEAMSPLITTER AND PARALLEL REFLECTING ELEMENT, AND RETROREFLECTING COMPONENT

BACKGROUND OF THE INVENTION

Moving-mirror interferometers include a beamsplitter for dividing a beam of entrant radiation into two beams. The beams are reunited at the same or a separate beamsplitter, after redirection by reflecting elements, one or more of which elements is moved to change the relative path lengths for the two beams within the interferometer. If the optical elements of the interferometer are properly aligned, the two beams combine to create an interference fringe of constant phase across the surface of the beamsplitter; alignment within a few micro-radians is required.

Such interferometers typically suffer from several disadvantageous features, most notable amongst which is a tendency for misalignment due to movement or vibration of the interferometer, gravitational forces, differential thermal expansions, and inaccurate translation of the moving mirror component; these effects are generally exacerbated, moreover, when the interferometer is employed in an industrial setting. Conventional moving-mirror interferometers are also difficult to assemble and align, and they are difficult to realign after replacement or repair of their components.

The prior art has addressed certain of these problems. In U.S. Pat. No. 2,841,049, Scott provides an interferometer that is immune to tilting of the back-to-back mirror element of which it is comprised. That feature allows scanning to be effected by movement of the double mirror, and in so doing also reduces greatly the level of accuracy required in the mirror translating system; it also affords a level of immunity to vibration. Scott does not however teach means by which the other problems referred to may be ameliorated; the interferometer is unduly complex, and it affords less than optimal tolerance for misalignment and ambient influences.

Moving-mirror interferometer design is also addressed in the technical literature: i.e., Steel, W. H., "Interferometers for Fourier Spectroscopy," Aspen Int. Conf. on Fourier Spectrosc. (1970), (G. A. Banasse, A. T. Stair, and D. J. Bakers, Eds)., AFCRL-71-0019, p. 43, (1971); Terrien, J., Rev. Opt., 38, 29, (1957); and Murty, M.V.R.K., J. Opt. Soc. Amer., 50, 83, (1960). In particular, the Steel article discusses a design in which a moving corner cube retroreflector is so arranged as to render the interferometer immune from tilt and shear of the retroreflector during translation; the other deficiencies noted above are not however addressed.

SUMMARY OF THE INVENTION

Accordingly, it is the broad object of the present invention to provide an interferometer in which problems of mirror motion tilt and shear, and the negative effects of vibration, gravitational forces, differential thermal expansion, and inaccurate translation of moving components, are substantially reduced if not eliminated entirely. Related objects of the invention are to provide such a system in which problems associated with assembly and part replacement are substantially avoided, which system is comprised of relatively few components and is of relatively incomplex and inexpensive manufacture.

It has now been found that the foregoing and related objects of the invention are attained by the provision of a two-arm interferometer comprising, in combination, support means, combiner means, double-reflecting means, retroreflecting means, and mounting means. The combiner means comprises a unified beamsplitter element and parallel reflecting element, and serves to split entrant radiation into first and second beams moving in the same direction along parallel first and second paths. The double-reflecting means has opposite sides, on which are provided substantially parallel plane reflective surfaces for reversely reflecting impinging radiation in opposite directions along substantially parallel paths and without rotation of the impinging beams about their axes of propagation. Radiation impinging upon the retroreflecting means is retroreflected along a third path, parallel to, and displaced from, the path of the impinging radiation and with an orientation relative thereto rotated 180° about its axis of propagation. The combiner means, the double-reflecting means, and the retroreflecting means are so mounted by the mounting means as to dispose the retroreflecting means in the first path, for retroreflection, with the second and third paths substantially aligned, and as to dispose the double-reflecting means, for opposite-side reflection, in both the second and the third paths; the means for mounting also enables translational movement of the retroreflecting means and/or the double-reflecting means on axes parallel to the paths defined. With the exception of the retroreflecting means, the interferometer of the invention is devoid of means, operatively disposed in the paths defined, for effecting any net rotational change about the axis of propagation of any beam.

More particularly, the operative beamsplitter element of the combiner means will have at least one face, and the reflector element thereof will have a plane reflective surface disposed parallel to that face; the combiner may also have a compensator element integrated into it. In the preferred embodiments, the double-reflecting means will comprise a back-to-back double mirror component. The means for mounting will most desirably flexibly mount at least one of the combiner means, the double-reflecting means, and the retroreflecting means, and the several components will be constructed for facile disassembly from the support means.

DETAILED DESCRIPTION OF THE ILLUSTRATED EMBODIMENTS

Figure 1:
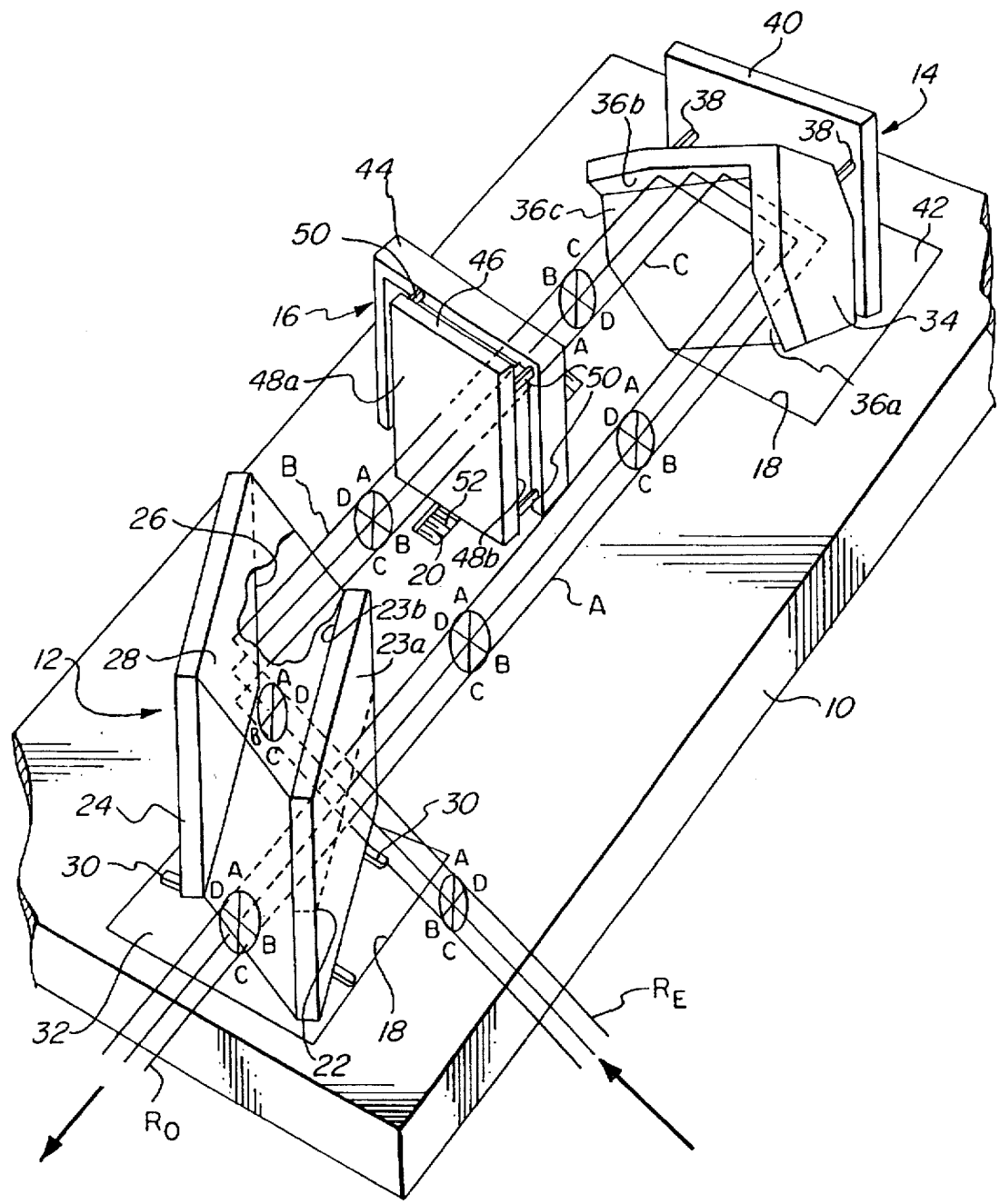
FIG. 1 is a diagrammatic perspective view depicting an interferometer embodying the present invention.

Turning now in detail to FIG. 1 of the drawing, therein illustrated is an interferometer embodying the present invention and comprised of a supporting base, generally designated by the numeral 10, on which are mounted a combiner component, a corner cube retroreflecting component, and a back-to-back mirror component, generally designated respectively by the numerals 12, 14, and 16. The components of the system are mounted in two square recesses 18 and an elongated slot 20, formed into the upper surface of the base 10, as will be described more fully hereinbelow.

The combiner 12 is a rigid, unified component consisting of a beamsplitter 22, of essentially conventional construction and having parallel plane faces 23a and 23b on its opposite sides, and a mirror element 24 with a plane reflective surface 26 in confronting relationship to the inner surface 23b of the beamsplitter, and parallel thereto. The elements 22, 24 are integrated by an interposed optically transparent material 28, albeit that means (not shown) may desirably be provided for enabling adjustment of the orientation of the surfaces 23 relative to the surface 26. The combiner is supported upon a square plate 32 by resiliently deflectable elements 30, which are of semi-rigid construction so as to permit motion parallel to the surfaces 23, 26 but not in directions perpendicular thereto, and the plate 32 is in turn seated in the recess 18 at one end of the base 10; thus, the component 12 is resiliently displaceable relative to the plate 32 and is yet isolated against the effects of distortions produced in the base 10.

The corner cube retroreflector component 14 includes a conventional retroreflector assembly 34, consisting of three elements providing mutually perpendicular confronting reflective plane surfaces 36a, 36b and 36c. The assembly 34 is connected to an upright panel 40 by semi-rigid resiliently deflectable elements 38; the panel 40 is affixed to a square plate 42, which is in turn seated in the recess 18 at the opposite end of the base 10.

Finally, the double mirror component 16 consists of a mirror element 46 having back-to-back substantially parallel plane reflective surfaces 48a and 48b on its opposite sides, and is joined to a mounting frame 44 by semi-rigid resiliently deflectable elements 50. The frame 44 has depending means (not shown) for threadably engaging a screw 52, which is disposed in the slot 20 and is rotatably driven (by means not shown) so as to translate the component 16 in opposite directions along the axis of the slot. This of course serves to dynamically change the spacing of the double-reflecting component 16 from the beamsplitter component 12 and the retroreflecting component 14, thereby lengthening and shortening the beam path distances between the reflective surfaces thereon, in a complementary manner, and affording the essential functionality to the interferometer.

As will readily be appreciated by those skilled in the art, entrant radiation $R_E$ impinging upon the outer surface 23a of the beamsplitter 22 (as indicated by the arrow in FIG. 1) will be divided into two separate beams, one of which will be reflected along path A and the other of which will pass through the beamsplitter 22 and be reflected by confronting mirror surface 26 along path B. The beam projected along path A will impinge upon one lateral half of the corner cube retroreflector 34, to produce a laterally displaced, parallel exit beam from the other half along path C (it will of course be appreciated that, in an interferometric sense, paths A and C are components of a single path between the beamsplitter and the double-sided mirror, by way of the retroreflector). The beams projected along paths B and C will be reversely reflected by surfaces 48a and 48b, respectfully, of the double-sided mirror 46 of component 16, ultimately to recombine at the beamsplitter 22 to create a constant phase interference fringe, and exit therefrom as output beam $R_o$.

As noted on FIG. 1, in being retroreflected by the assembly 34 the beam passing along path A is rotated about its axis of propagation by 180°, to have, on path C, the indicated orientation. The beam projected along path B undergoes no such rotation (albeit that 180° rotation about a vertical axis does occur in reflection from the surface 26, as also occurs in reflection from the surface 23a).

The functional characteristics of the components of the instant system are well known to those skilled in the art. Thus, the corner cube retroreflector causes a collimated beam of radiation incident on one half (lateral or transverse) of the structure to emerge from the other half parallel to the incident beam, but traveling in the opposite direction and rotated about its central axis by 180°. Interference fringes of constant phase are therefore produced in the instant interferometer, notwithstanding that the corner cube retroreflector may be only approximately located, and irrespective of the exact orientation and tilt angle.

As to the combiner unit, one component of a beam of collimated radiation incident on the side of the beamsplitter facing the reflecting surface (i.e., reversed from the illustrated embodiment) is transmitted through the beamsplitter, while another component is reflected from the beamsplitter and the parallel reflecting surface; the transmitted beam and the twice-reflected beam move parallel to one another and in the same direction, without relative rotation. A beam hitting the combiner from the opposite side (as illustrated, and as previously described) will be partially reflected from the beamsplitter, and will travel parallel to, and in the same direction as, the beam component transmitted through the beamsplitter and reflected from the parallel mirror element, again having no rotation with respect thereto.

Due to the foregoing characteristics, beams hitting the reflective surfaces of the back-to-back mirror assembly will be rotated by 180° with respect to one another. If therefore the double mirror were, for example, tilted about its horizontal axis, the paths of the two opposing beams at points A would be lengthened and shortened, respectively, by an equal amount, as would be the paths at points C, but in the inverse relationship. Similarly, if the back-to-back double mirror were tilted about its vertical axis, the opposing beam paths at points B would be lengthened and shortened by the same amount, as would also be true of the paths of the beams at points D, but again in the inverse relationship. While tilting of the back-to-back double mirror may cause an apparent proportionate directional shifting of the observed fringes, the production of fringes is essentially dependent only upon substantial parallelism of the reflective surfaces of the double mirror, and such apparent shifting would therefore have no adverse consequence. It should nevertheless be appreciated that the surfaces of the back-to-back mirror need not be strictly mutually parallel, especially in those instances in which the combiner unit, or its components, can be adjusted to correct for any such deviation from parallelism.

The combined characteristics of the corner cube retroreflector and the combiner unit therefore ensure that any beam incident on the beamsplitter will arrive at the back-to-back mirror as oppositely directed, parallel component beams, relatively rotated by 180° about their central axes. Because of this, and because the two component beams recombine to produce a fringe pattern at the beamsplitter that is independent of the tilt of the back-to-back double mirror, there is considerable tolerance for inaccuracy in component mounting, which in turn renders the interferometer relatively facile to assemble and repair. Since precise mutual alignment of the interferometer components is not required, moreover, they can be flexibly mounted so as to effectively isolate them against distortion of the support, which may therefore be made from a relatively lightweight and non-rigid material having advantageous damping properties.

These features also make it possible to effect dynamic beam path-length variation by moving any of the optical components of the system, and to employ means for doing so that need not be highly accurate. As a practical matter, however, path-length differences will generally be produced by effecting translation of either the double mirror assembly or the corner cube retroreflector, or both, since doing so will minimize motion of the exiting beam.

Although of somewhat diagrammatic character, and although any suitable mounting and locating means may be substituted, the illustrated component-mounting arrangement may be employed in a functional instrument to enable facile disassembly for repair and replacement; means for disengagably fastening the plates 32 within the recesses 18 may also desirably be provided. The resilient connecting elements employed may advantageously take the form of flat spring pieces, so oriented and attached as to permit resilient deflection of the associated optical member in such a manner as to best isolate it against forces transmitted from the support base or frame; as indicated above, such "semi-rigid" connecting means will permit deflection of the mounted element in a direction perpendicular to the direction of impinging radiation, while being rigid against deflection in directions parallel thereto. The support frame may beneficially be made from a material such as aluminum, steel, and reinforced and unreinforced plastics, to impart vibration-damping properties to it and to the system, and damping materials, such as silicon rubber and the like, may also be incorporated as a means for further reducing fugitive motion in the optical components.

It will also be appreciated that substitutions for, and variants of, the features and components described may be made without departure from the concepts of the present invention. For example, although a corner cube retroreflector is presently contemplated as best achieving the objectives of the invention, it is possible that a functionally similar optical component may be effectively substituted. Various means for effecting and enabling translation of the movable component or components, such as flexures, mechanical bearings, air bearings, and the like, will similarly be evident to those skilled in the art, the screw arrangement shown in the drawings being presented merely for illustrative purposes and not as representing a practical choice; a highly effective motion-transfer mechanism, suitable for use herein, is described in Carangelo et al co-pending U.S. application Ser. No. 08/201,757, issued as U.S. Pat. No 5,486,917 and being of common assignment herewith. Finally, it will be appreciated that the interferometer of the invention will typically be incorporated into a spectrometer, such as an FT-IR instrument, wherein transfer optics, electronic data processing means, and other conventional systems and components will be provided for operative association with the interferometer.

Thus, it can be seen that the present invention provides an interferometer in which problems of mirror motion tilt and shear during translation, and the detrimental effects of vibration, gravitational forces, differential thermal expansion, and inaccurate translation of the moving mirror component, are substantially reduced if not eliminated entirely. Problems associated with assembly and part replacement are also at least substantially avoided in the instant system, which affords the added advantages of comprising relatively few components and of being of relatively incomplex and inexpensive manufacture.

Having thus described the invention, what is claimed is:

1. A two-arm interferometer comprising, in combination: support means; combiner means comprising a unified beamsplitter element and a parallel reflecting element, for splitting entrant radiation into first and second beams moving in the same direction along parallel first and second paths; double-reflecting means, having opposite sides with substantially parallel plane reflective surfaces thereon, for reversely reflecting radiation impinging upon said surfaces in opposite directions along substantially parallel paths and without rotation of the impinging beams about their axes of propagation; retroreflecting means for retroreflecting radiation impinging thereupon along a third path that lies parallel to, and is displaced from, the path of the radiation impinging upon said retroreflecting means and with an orientation relative thereto rotated 180° about its axis of propagation; and means for mounting said combiner means, said double-reflecting means, and said retroreflecting means on said support means, said retroreflecting means being disposed, for retroreflection, in said first path and with said second and third paths in substantial alignment with one another, and said double-reflecting means being disposed, for reflection from said opposite side reflective surfaces thereof, in both of said second and third paths, said means for mounting enabling translational movement of at least one of said retroreflecting means and said double-reflecting means, on axes parallel to said paths, and said interferometer being devoid of means, other than said retroreflecting means, operatively disposed in any of said paths and functional to effect any net rotational change about the axis of propagation of any beam.

2. The interferometer of claim 1 wherein said beamsplitter element has a flat face, and wherein said reflector element has a plane reflective surface disposed substantially parallel to said flat face of said beamsplitter element.

3. The interferometer of claim 1 wherein said double-reflecting means comprises a back-to-back double mirror component.

4. The interferometer of claim 1 wherein said means for mounting mounts, for resilient deflection, at least one of said beam-splitting means, said double-reflecting means, and said retroreflecting means.

5. The interferometer of claim 4 wherein said means for mounting permits resilient deflection of said at least one means in a direction perpendicular to the direction of radiation impinging upon said at least one means, and is rigid in a direction parallel to said direction of impinging radiation.

\* \* \* \* \*